Sept. 11, 1951 J. P. SCHWARTZ ET AL 2,567,681
HYDRAULIC JACK
Filed Feb. 14, 1947 3 Sheets-Sheet 1
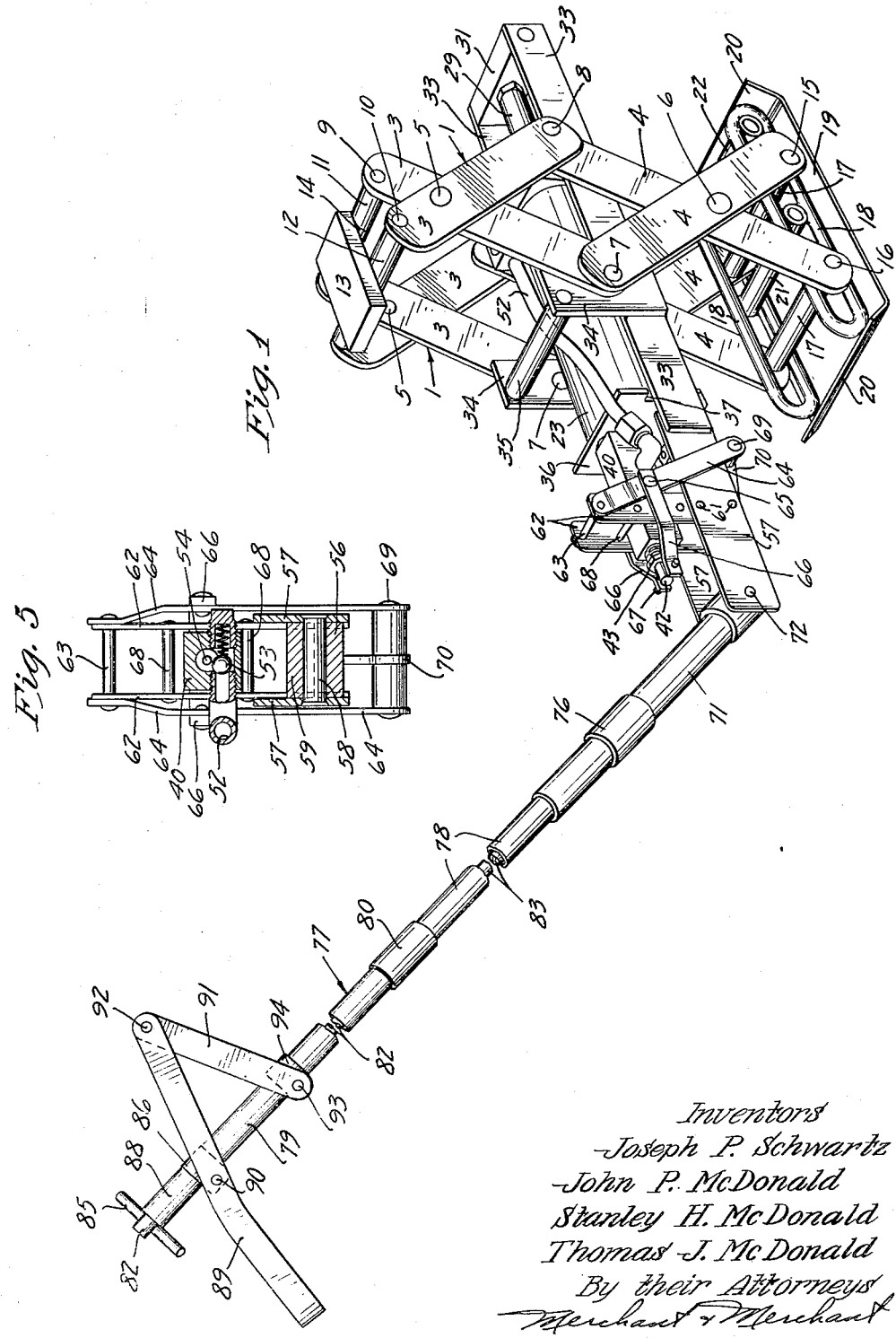
Inventors
Joseph P. Schwartz
John P. McDonald
Stanley H. McDonald
Thomas J. McDonald
By their Attorneys
Merchant & Merchant Sept. 11, 1951 J. P. SCHWARTZ ET AL 2,567,681
HYDRAULIC JACK
Filed Feb. 14, 1947 3 Sheets-Sheet 2
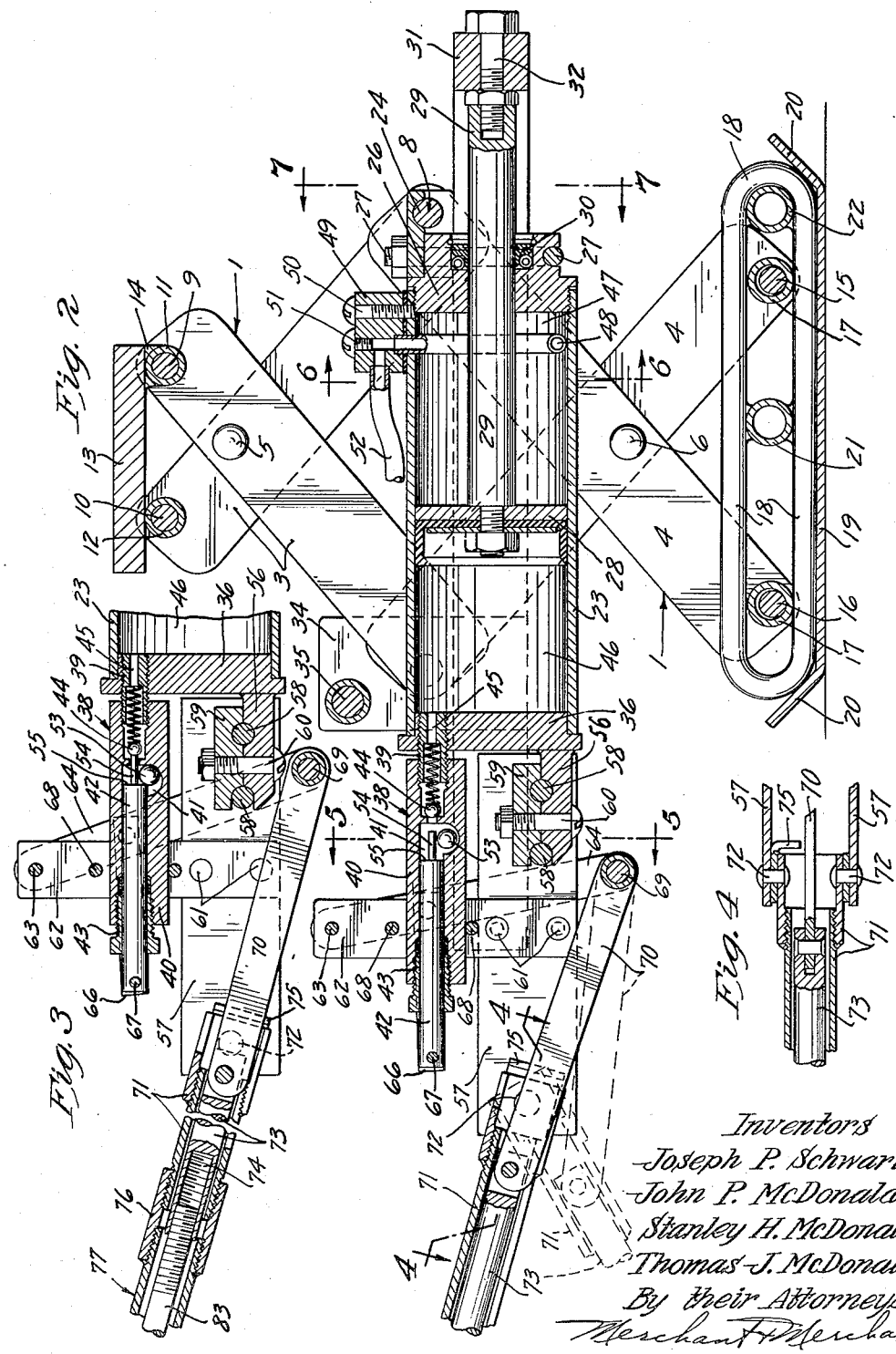
Inventors
Joseph P. Schwartz
John P. McDonald
Stanley H. McDonald
Thomas J. McDonald
By their Attorneys
Merchant & Merchant

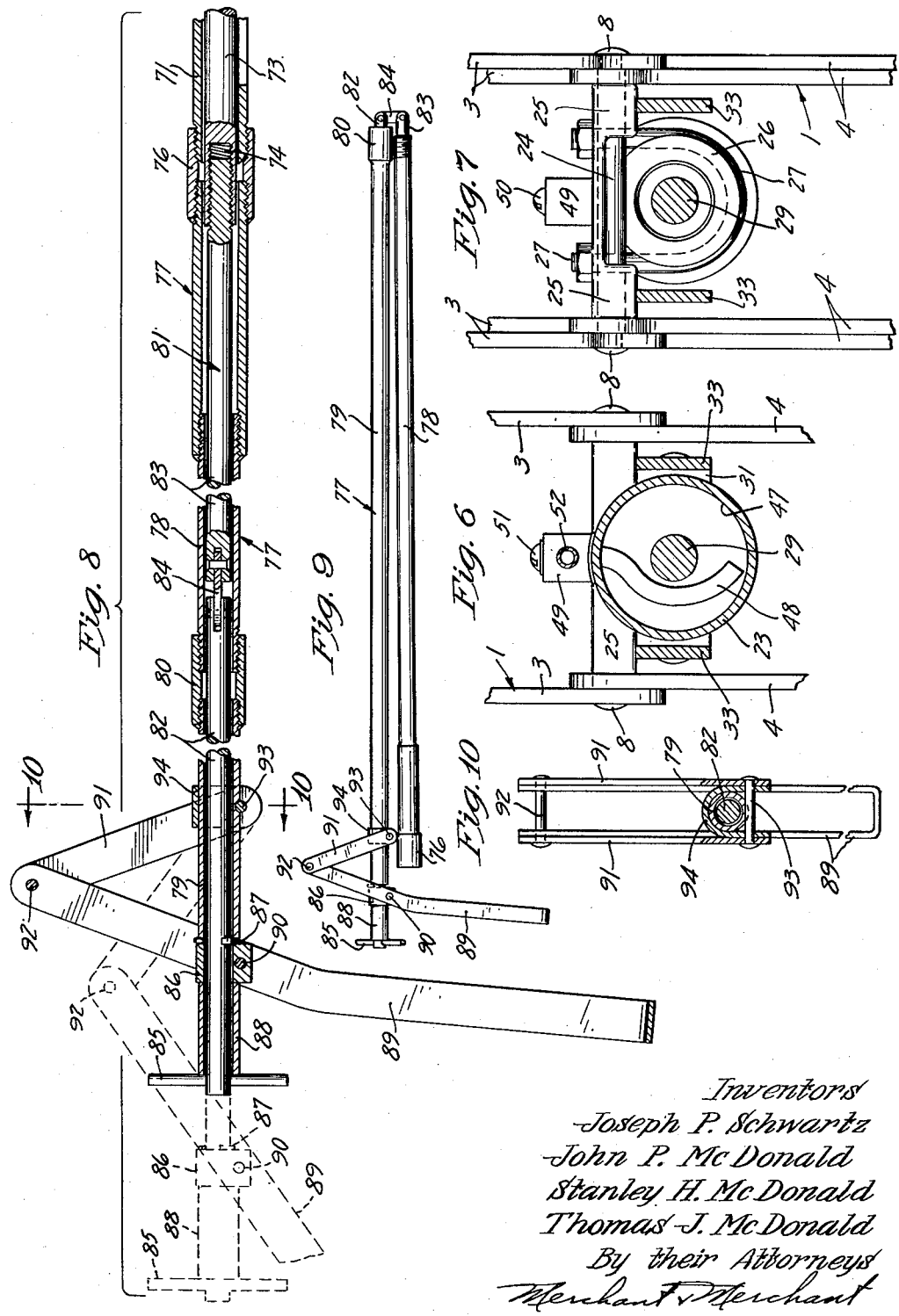

Patented Sept. 11, 1951

2,567,681

UNITED STATES PATENT OFFICE 2,567,681

HYDRAULIC JACK

Joseph P. Schwartz, John P. McDonald, Stanley H. McDonald, and Thomas J. McDonald, St. Paul, Minn.

Application February 14, 1947, Serial No. 728,420

6 Claims. (Cl. 60—52)

This invention relates to jacks and has to do with hydraulic jacks specifically intended for use in automobiles and like vehicles.

An important object of our invention is the provision of a novel base structure whereby the lazy tong lifting mechanism will be automatically maintained in centered relation to the base at all times.

Another object of our invention is the provision of novel means for securing the hydraulic lifting cylinder to the lazy tong lifting mechanism, whereby the lifting cylinder will be maintained in substantially horizontal position between the limits of movement of the lazy tong mechanism.

A still further object of our invention is the provision of novel operating handle means and inner-connecting linkage between the handle means and the lifting cylinder.

The above and still numerous other objects of our invention will become apparent from the following detailed specification, appended claims, and attached drawings.

Referring to the drawings, wherein like characters indicate like parts throughout the several views:

Fig. 1 is a perspective view of our novel jack mechanism, some parts being broken away;

Fig. 2 is a vertical axial section through the jack mechanism, some parts being broken away;

Fig. 3 is a fragmentary detail corresponding to Fig. 2, but showing a different position of some of the parts;

Fig. 4 is a fragmentary sectional detail taken on the line 4—4 of Fig. 2;

Fig. 5 is a transverse section taken on the line 5—5 of Fig. 2;

Fig. 6 is a transverse section taken on the line 6—6 of Fig. 2;

Fig. 7 is a fragmentary view, partly in end elevation and partly in section, taken on the line 7—7 of Fig. 2;

Fig. 8 is an axial section, taken through the operating handle mechanism;

Fig. 9 is a view in side elevation of the operating handle means showing the same removed from the jack mechanism and in a folded position; and Fig. 10 is a cross-sectional view taken on the line 10—10 of Fig. 8.

Referring with greater particularity to the drawings, we provide a pair of laterally spaced lazy tongs, each thereof, in its entirety, identified by the numeral 1, and each comprising two pivotally-connected pairs of crossed links 3 and 4. The crossed links 3 are pivotally connected, as at 5, and the crossed links 4 are pivotally connected, as at 6. The lower ends of the pairs of crossed links 3 are pivotally connected to the upper ends of the crossed links 4, as indicated by the numerals 7 and 8. The upper ends of pairs of crossed links 3 are pivotally connected by means of spanner members in the nature of pins 9 and 10. A spacer 11 is journalled on pin 9, whereas a spacer 12 is journalled on the pin 10. A load-carrying plate 13 has one end secured to the spacer 11, as indicated at 14, by welding or the like, and has its free end extending forwardly and slidably resting upon the spacer 12.

Opposite pairs of crossed links 4 have their lower ends connected by means of pivot pins 15 and 16, upon which are journalled foot-acting spacing rollers 17. As shown, the spacing rollers 17 are adapted to ride upon and be contained within a pair of laterally spaced elongated guideways 18, preferably and as shown, in the nature of cross-sectionally circular loops. The guideways are secured by welding or otherwise to a base plate 19 having upturned opposite ends 20 to facilitate movement over rough terrain. Guideways 18 are provided with transverse reinforcing bars 21 and 22. As will be seen, the rollers 17 ride upon the top surfaces of the lower base-engaging portions of the guideway 18 and are retained within the guideway by means of the upper portion thereof.

A horizontally-disposed hydraulic lifting cylinder element 23 is disposed between the lazy tongs 1 and is pivotally connected at its head end to the links 3 and 4 of said lazy tongs. Referring particularly to Figs. 2 and 7, it will be observed that the pivotal connection 8 is in the nature of a pin 24, which extends between the spaced pairs of lazy tongs and through a spacing bar 25. The head end 26 of the lifting cylinder 23 is notched to receive a nut-equipped U-bolt 27, which passes upwardly through the spacing bar 25 to secure the cylinder 23 thereto.

A plunger of conventional design is mounted for reciprocatory movements in the cylinder 23 and consists of a piston 28 provided with a piston rod 29, which extends through the head end 26, through a packing gland 30 therein, and which is secured to a cross bar 31 by means of a bolt or the like 32. Riveted or otherwise secured to the ends of the cross bar 31, and extending longitudinally of the cylinder 23, one on each side thereof, is a pair of drawbars 33. The drawbars 33 are provided with upstanding anchor plates 34 rigidly secured thereto intermediate their ends by welding or otherwise. The anchor plates 34 are connected together adjacent their upper ends by a cross member 35 and are pivotally secured, intermediate their ends, to the pivots 7 of both of the lazy tongs 1.

At the end of the cylinder 23, opposite the head end thereof, is a closure plate 36, which extends laterally outwardly on either side of the cylinder 23 and is notched to form guide means in the nature of oppositely opening channels 37 which slidably receive the drawbar elements 33. It will be seen that, from this construction, the closure plate 36 and adjacent end of the cylinder 23 are supported by the drawbars 33 in their sliding movements thereon.

A high-pressure pump, indicated in its entirety by the numeral 38, is rigidly secured to the closure plate 36 by means of a tubular nipple 39 and comprises a housing 40 having an axially-extended chamber 41 therein and a piston-acting plunger 42 mounted in the chamber 41 for reciprocal movements. Plunger 42 has a rearwardly-extended free end which projects through a packing gland 43 in the outer end of the housing 40.

A spring-pressed ball check valve 44 is disposed within a passage 45 connecting the chamber 41 of the pump 38 with a pressure chamber end 46 of the cylinder 23. Extending downwardly into the lower portion of the reservoir end 47 of cylinder 23 is a fluid conduit means in the form of a bent tube 48, which is secured at its upper end in a junction block 49. The junction block is held in position on the cylinder 23 by means of a screw 50 and is provided with a filler opening that is normally closed by a cap screw 51. Communicating with the tube 48 and extending from the junction block 49 to the chamber 41 of the high-pressure pump 38 is a conduit 52. A spring pressed ball check valve 53 (see particularly Fig. 5) normally closes the passage opening from the conduit 52 into the chamber 41.

A reduced, axially-extended pin 54 on the plunger 42 is adapted, under extreme longitudinal movements of the plunger 42, to enter the passage 45 to upset the check valve 44. Simultaneously, the shoulder-forming end 55 of the plunger 42 is adapted to engage the check valve 53 and unseat the same.

Rigidly secured to and projecting rearwardly from the closure plate 36, below the pump housing 40, is a supporting boss 56. A pair of supporting arms 57 are secured to and carried by the supporting boss 56 by means of inner-connecting pins 58 which are riveted to the spaced arms 57 and clamped to the boss 56 by means of a clamping plate 59 and a nut-equipped clamping screw 60. Riveted, as at 61, to the spaced supporting arms 57 are a pair of brackets 62. Pivotally secured, as indicated at 63, to the upper ends of supporting brackets 62 are a pair of depending levers 64. Pivotally connected, as indicated at 65, to independent members of the depending levers 64 are a pair of links 66 which, at their outer ends, are pivotally connected together and to the outwardly projecting end of plunger 42 by means of a pin or the like 67. The brackets 62 are maintained in spaced relationship by means of spaced pins 68. At their lower ends, the levers 64 are connected by a pin 69. Pivotally secured to the pin 69, intermediate the levers 64, is a link 70, the outer end of which projects into a split sleeve-like coupling 71. The split sleeve-like coupling 71 is pivotally secured between the outer ends of the supporting arms 57, as indicated at 72, on an axis fixed with respect to the high-pressure cylinder 40. Pivotally secured to the link 70, within the coupling 71 and mounted for reciprocation within the coupling 71, is a connector 73 in the form of a stub shaft which, at its outer end, is provided with a threaded socket 74. A stop member 75 is secured to one of the pivots 72 between the split coupling 71 and one of the arms 57 (see particularly Figs. 2, 3, and 4).

At its outer end, the coupling 71 is threaded to receive the threaded end 76 of a tubular operating handle 77. As shown in Figs. 1, 8, and 9, the operating handle 77 is made up of two handle sections 78 and 79 which are joined by a threaded coupling 80. The threaded coupling 80 is welded or otherwise permanently secured to the section 79 and has threaded engagement with the section 78.

An operating rod 81, preferably and as shown, made up of two operating rod sections 82 and 83 hingedly connected together by means of a link 84 (see Figs. 8 and 9), has screw-threaded engagement with the connector 73 and extends longitudinally through the tubular operating handle 77, terminating at its outer end in a radially extended handle member 85. Link 84 is so situated with respect to the coupling 80 of the operating handle 77 that when the handle section 78 is unscrewed from the handle section 79 and withdrawn slightly therefrom, the operating rod sections 82 and 83 may be folded upon each other, as indicated in Fig. 9. Near its extreme outer end, operating rod section 83 is provided with a hinge block 86, which is journalled for rotation thereon, being limited in forward movement by a cotter key 87 and against rearward movement by means of a sleeve-like casing element 88, which is interposed between said block 86 and the handle member 85. A bifurcated operating lever 89 is pivoted at its intermediate portion to opposite sides of the hinge block 86, as indicated at 90. A pair of links 91 has one of the ends thereof pivotally secured to one end of operating lever 89, as indicated at 92, and the other end pivotally secured to the operating handle section 79, as indicated at 93, through medium of a yoke 94.

It will be seen that engagement of the pin 69 with the lower edges of the supporting arms 57 definitely limits outward movement of the operating rod 81, operating lever 89, and plunger 42 within the pump housing 40. Inward movement of the operating lever 89, operating rod 81, and pump plunger 42 is positively limited by engagement of the hinge block 86 with the outer end of the operating handle section 79. However, the forward limits of movement of the plunger 42 within the pump housing may be varied by shortening and lengthening the operating rod 81. In other words, the precise length of the rod 81 is determined by the extent to which the threaded end thereof is screwed into the threaded socket 74 of the connector 73. Thus, when the operating rod 81 is screwed fully into the socket 74, as indicated in Fig. 8, the said rod 81 operates to limit the stroke of the pressure plunger 42 to that required to produce a normal pumping structure without upsetting the check valves 44 and 53. Likewise, when the operating rod 81 is lengthened by partially unscrewing the same from the socket 74 to the extent shown in Fig. 3, the pumping stroke of the plunger 42 within the housing 40 is lengthened to the extent that it will unseat check valves 44 and 53 (see Fig. 3). Thus, in effect, the lengthening and shortening of the operating rod 81 within the tubular handle 77 provides an adjustable means for stopping the forward motion of the plunger 42 in the housing 40.

Operation

When it is desired to operate the jack to raise a vehicle or other object, the operating handle sections 78 and 79 are screwed together and to the sleeve-like split coupling 71 (see Fig. 1). The operating rod 81 is then, by means of the handle member 85, screw-threaded into full engagement with the connector 73 (see Fig. 8). The jack is then placed under the object to be raised with the load-carrying plate 13 immediately overlying the axle or other portion to be engaged thereby. Manipulation of the bifurcated operating lever 89 will reciprocate the pump plunger 42 in the housing 40 within normal pumping limits. On the outward or suction stroke of the pump plunger 42, fluid is drawn from the reservoir end 47 of lifting cylinder 23 through the check valve 53, into the chamber 41. The pressure stroke of the pump plunger 42 will then force fluid from the chamber 41 past the ball check valve 44 through the passage 45 into the pressure chamber 46 of the cylinder 23. Entrance of fluid under pressure into the pressure chamber 46 will force the piston 28 and piston rod 29 toward the head end of the cylinder 23 and thereby cause the drawbars 33 to move longitudinally of the piston 29 to operate the lazy tongs. The mounting of the cylinder 23 to one of the pairs of crossed links, as at 8, the mounting of the drawbars 33 to the other of the crossed links, as at 7, and the sliding engagement of the drawbars 33 in the oppositely-opening channels 37 of the closure plate 36, cooperate to maintain parallelism between the cylinder 23 and drawbars 33 independently of the plunger 28, 29 throughout the extension and contraction of the lazy tongs.

It should be noted that the rolling action of the foot-acting spacer rollers 15 and 16 upon the guideways 18 not only reduces friction to a minimum but automatically assures centering of the pairs of lazy tongs 1 with respect to the base member 19. This arrangement also assures a vertical disposition of the jack throughout the elongation and contraction of the lazy tongs.

When it is desired to lower the jack mechanism, it is but necessary to rotate the handle member 85 in a direction to partially unscrew the operating rod section 82 from the connector 73 to the extent shown in Fig. 3. The operating lever 89 is then moved in a direction to force the pump plunger 42 against the check valves 44 and 53 to unseat the same and allow fluid to pass from the pressure chamber 46 through the passage 45, the check valves 44 and 53, and the conduit 52 back to the reservoir end 47 of the piston 43. A minimum weight on the load carrying plate 13 is sufficient to cause contraction of the lazy tongs and movement of the fluid from chamber 46 to the reservoir 47.

The pivotal connection of the tubular handle 77 to the cylinder 23 through means of tubular split coupling 71 and the supporting arms 57 makes it possible to operate the handle and the bifurcated operating lever 89 from a wide range of positions varying from ground level to about 45 degrees therefrom.

While we have illustrated and described a preferred embodiment of our invention as required by Section 4888 of the United States Statutes, it should be obvious that the novelty of our structure is such that the same is subject to considerable modification without departure from the scope of the appended claims.

What we claim is:

1. In a lifting jack mechanism, a plunger-equipped lifting cylinder, a source of fluid, a high-pressure pump cylinder, a pressure plunger working in said pump cylinder, passages connecting the interior of the pump cylinder to the fluid source and to the interior of the lifting cylinder, an outwardly-opening check valve in the passage between the pump cylinder and lifting cylinder, an inwardly-opening check valve controlling the passage between the pump cylinder and the fluid source, said check valves being orientated and arranged to be coincidentally engaged and unseated by the high pressure pump plunger upon advancement of the latter beyond the normal inner limit of its travel, guide means in the nature of an operating handle extending from the jack structure and pivoted thereto on an axis fixed with respect to the high-pressure cylinder, an operating rod extending through and mounted for rotation and axial reciprocation in said guide means, operating connections between the inner end of the operating rod and the plunger, stop means limiting outward movements of the operating rod and pressure plunger, and means for lengthening and shortening said operating rod, said operating rod in its shortened condition limiting the stroke of the pressure plunger to that required to produce a normal pumping stroke without unseating the check valves and in its lengthened condition permitting advancement of the pressure plunger to a position whereat it engages and unseats said check valves.

2. The structure defined in claim 1 in which said guide means is in the nature of a tubular handle and in which said operating rod projects outwardly from said tubular handle and terminates in a handle member for rotating said operating rod.

3. In a lifting jack mechanism, a plunger-equipped lifting cylinder, a source of fluid, a high-pressure pump cylinder, a pressure plunger working in said pump cylinder, passages connecting the interior of the pump cylinder to the fluid source and to the interior of the lifting cylinder, an outwardly-opening check valve in the passage between the pump cylinder and lifting cylinder, an inwardly-opening check valve controlling the passage between the pump cylinder and the fluid source, said check valves being orientated and arranged to be coincidentally engaged and unseated by the high pressure pump plunger upon advancement of the latter beyond the normal inner limit of its travel, coupling means extending from the jack structure and pivoted thereto on an axis fixed with respect to the high pressure cylinder, a connector mounted for reciprocation in said coupling means, lever means connecting said connector with said pressure plunger, a tubular handle adapted to be removably secured to said coupling, an operating rod mounted for rotation and reciprocation within said tubular handle and adjustably detachably secured to said connector, and stop means for limiting the outward movement of the operating rod and pressure plunger, said operating rod in one condition of adjustment with respect to said connector operating to limit the stroke of the pressure plunger to that required to produce a normal pumping stroke without unseating the check valves and operating in another condition of adjustment with respect to said connector to permit advancement of the pressure plunger to a position whereat it engages and simultaneously unseats said check valves.

4. The structure defined in claim 3, in which said tubular handle is made up of a plurality of detachable sections and said operating rod is made up of a plurality of hingedly connected sections, said hinge connection of said operating rod sections being substantially coincidental with the joint between said operating handle sections, whereby said handle and operating rod sections may be folded upon themselves when the operating handle sections are disconnected.

5. The structure defined in claim 3 in which said operating rod projects outwardly from the free end of said operating handle and is provided with a handle member adjacent its extreme outer end to facilitate rotation thereof and in further combination with means for reciprocating said operating rod in said tubular handle, said means comprising a hinge block rotatively secured to said operating rod for axial movements therewith and positioned between the handle member thereof and the outer end of said tubular member, a pair of links pivotally secured at one of their ends to said tubular handle, and an operating lever pivotally secured intermediate its ends to said hinge block and at one of its ends to the other ends of said links.

6. In a lifting jack mechanism, a plunger-equipped lifting cylinder, a source of fluid, a high-pressure pump cylinder, a pressure plunger working in said pump cylinder, passages connecting the interior of the pump cylinder to the fluid source and to the interior of the lifting cylinder, a check valve in the passage between the pump cylinder and lifting cylinder opening in the direction of the lifting cylinder, a check valve controlling the passage between the pump cylinder and the fluid source and opening in the direction of the pump cylinder, said check valves being orientated and arranged to be coincidentally engaged and unseated by the high-pressure pump plunger upon advancement of the latter beyond the normal inner limit of its travel, a tubular handle extending from the jack structure and pivoted thereto on an axis fixed with respect to the high-pressure cylinder, an operating rod extending through and mounted for rotation and axial reciprocation in said tubular handle, operating connections between the inner end of the operating rod and the plunger, stop means limiting outward movement of the operating rod and pressure plunger, stop means limiting inward movement of the operating rod and pressure plunger, means for varying the length of the stroke of said operating rod and pressure plunger from that required to produce a normal pumping stroke without unseating the check valves to a length to permit advancement of the pressure plunger to engage and unseat the check valves, said means comprising an extensible connection between said operating rod and said plunger, and a handle on the free end of said operating rod for causing extending and retracting movements to be imparted to said connection.

JOSEPH P. SCHWARTZ.
JOHN P. McDONALD.
STANLEY H. McDONALD.
THOMAS J. McDONALD.

REFERENCES CITED

The following references are of record in the file of this patent:

UNITED STATES PATENTS

| Number | Name | Date |
|---|---|---|
| 1,349,801 | Alsten | Aug. 17, 1920 |
| 1,590,849 | Nilson | June 29, 1926 |
| 1,664,579 | Twyman | Apr. 3, 1928 |
| 1,709,000 | Bolens | Apr. 16, 1929 |
| 1,745,067 | Torrance | Jan. 28, 1930 |
| 1,869,687 | Hart | Aug. 2, 1932 |
| 1,880,732 | Bolens | Oct. 4, 1932 |
| 1,954,558 | Conrad | Apr. 10, 1934 |
| 2,100,564 | Mandl | Nov. 30, 1937 |
| 2,121,861 | Dickerson | June 28, 1938 |
| 2,213,285 | Nilson | Sept. 3, 1940 |
| 2,359,060 | Strom | Sept. 26, 1944 |

FOREIGN PATENTS

| Number | Country | Date |
|---|---|---|
| 153,904 | Switzerland | July 1, 1932 |
| 199,626 | Switzerland | Feb. 1, 1949 |
| 286,998 | Great Britain | Mar. 15, 1928 |
| 335,461 | Germany | Apr. 4, 1921 |